Figure 1:
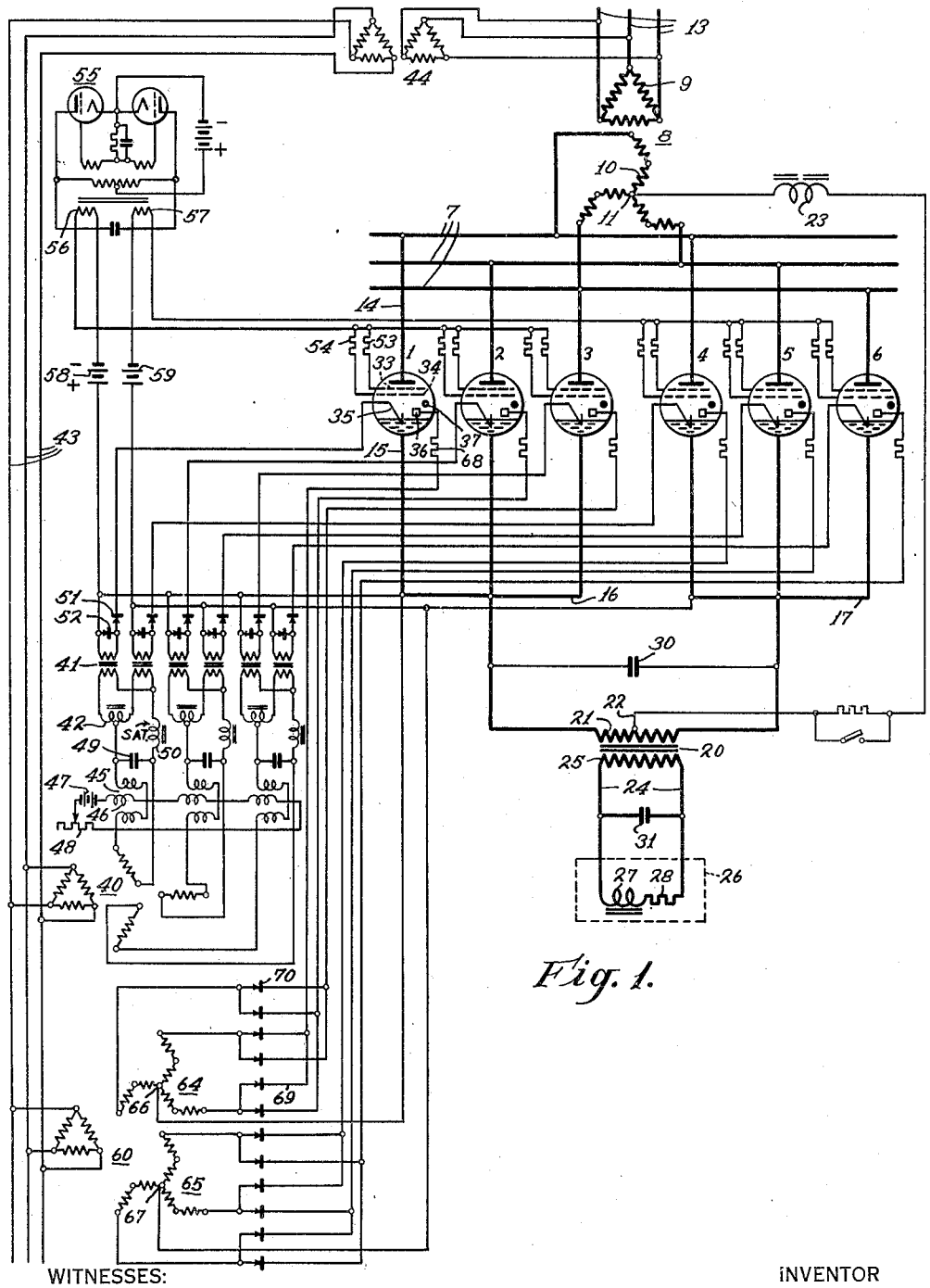

May 25, 1948.  J. L. BOYER  2,442,258
CONTROL CIRCUITS FOR HIGH-FREQUENCY ELECTRONIC CONVERTERS
Filed Dec. 14, 1946  2 Sheets-Sheet 1

WITNESSES:
Edward Michaels
Nw. C. Groome

INVENTOR
John L. Boyer.
BY O. B. Buchanan
ATTORNEY

Patented May 25, 1948

2,442,258

UNITED STATES PATENT OFFICE 2,442,258

CONTROL CIRCUITS FOR HIGH-FREQUENCY ELECTRONIC CONVERTERS

John L. Boyer, Wilkinsburg, Pa., assignor to Westinghouse Electric Corporation, East Pittsburgh, Pa., a corporation of Pennsylvania Application December 14, 1946, Serial No. 716,196

13 Claims. (Cl. 172—281)

My invention relates to electronic frequency-changers or converters for converting directly from alternating current of one frequency to alternating current of a higher frequency. More particularly, my invention relates to high-frequency converters utilizing gas or vapor-filled tubes, whereby an output can be obtained, having a kilowatt rating which is greater than that which can be economically obtained with high-vacuum tubes.

An important field of application of the invention is in supplying energy for an induction furnace requiring frequencies in the range of from 1000 to 2000 cycles per second, more or less. This is a frequency-range in which rotating motor-generator sets have poor efficiency and poor regulating characteristics, and in which high-vacuum-tube oscillators can not be economically used.

The principal object of my present invention is to provide new excitation control-circuits for high-frequency converters of the type which I have mentioned, and more particularly for high-frequency converters utilizing ignitrons.

There have been two reasons why ignitrons have not been utilized heretofore, as converters for changing either a direct-current input or a commercial-frequency alternating-current input, into frequencies as high as 1000 cycles, more or less. One drawback has been the amount of power which is required to energize the ignitor, which runs into commercially prohibitive amounts of excitation-power, with correspondingly difficult control, when the ignitor must be energized, once each half-cycle, at the high-frequency rate. A second, and perhaps more fundamental, drawback has been that, regardless of power-requirements, and regardless of cost, the initiation of the ignitor-excitation requires a variable time of the order of one millisecond, which is more or less immaterial, for 60-cycle operation, but which amounts to about 360 electrical degrees for 1000-cycle operation; and this ignitor-exciting time is a random phenomenon, subject to wide fluctuations from cycle to cycle, with fluctuations so great as to make it impracticable, heretofore, to control the ignitor at a frequency approaching anything like 1000 cycles.

It is an object of my present invention to provide an alternating-current frequency-converter utilizing ignitrons for converting directly from a commercial frequency of 60 cycles or the like, to a high frequency of the order of 1000 cycles or the like. The excitation-circuits consist of three parts: (1) an input-frequency firing-circuit for the ignitors, (2) excitation-grids and control or shielded grids, with a negative direct-current bias and an output-frequency control-voltage applied to said grids, so as to periodically block the initiation of the firing-operation of the ignitrons, at the output-frequency rate, and (3) an auxiliary anode or electrode, with a holding circuit for maintaining a holding-arc on the auxiliary anode for 120 input-frequency degrees, or for as long a part of the positive input-frequency half-cycle as it may be desirable to keep on refiring each tube at the high-frequency rate. These excitation-circuits are utilized with suitable output power-circuits for commutating the output-current, or assisting in commutating the output-current, at the high-frequency rate, a desirable power-circuit for this purpose being the subject-matter of my concurrently filed application Serial No. 716,197.

A further object of my invention is to provide a broad-range phase-adjustment means, for adjusting the firing-time of a rectifier or inverter tube, and including a holding-circuit, energized from two input-phases, through rectifiers.

It is a still further object of my invention to provide a multi-ignitron converter utilizing an output-frequency-modulated shield-grid-means, in combination with an input-frequency-energized ignitor and an auxiliary-anode holding-circuit.

Figure 2:
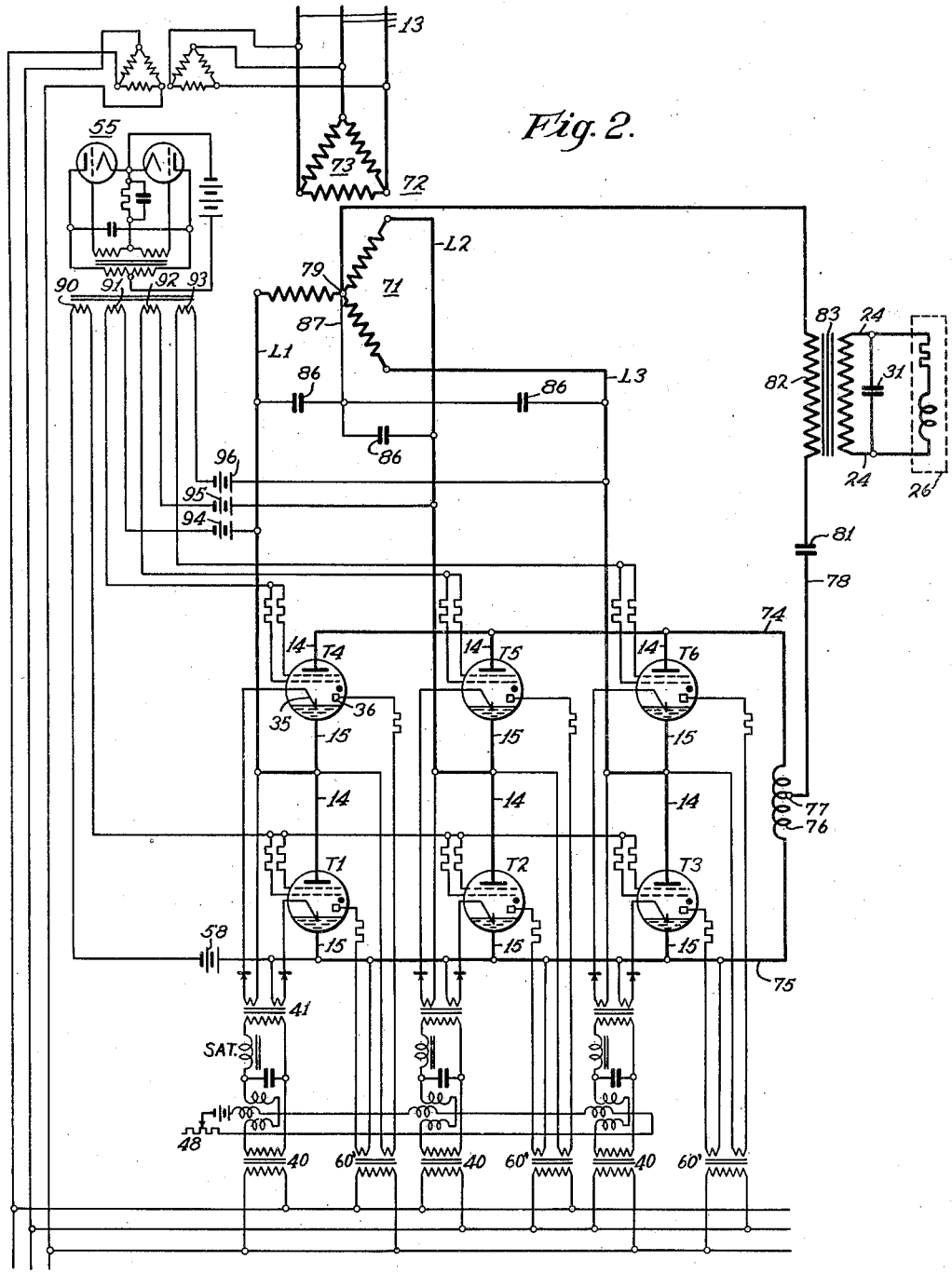

With the foregoing and other objects in view, my invention consists in the circuits, systems, methods, combinations and parts, hereinafter described and claimed, and illustrated in the accompanying drawing, wherein Figures 1 and 2 are simplified diagrammatic views illustrating the essential features of two different forms of embodiment of my invention, omitting known features of switches, voltage-regulators, and other like features which are not necessary to an understanding of the present invention.

In Figure 1, I show the fundamental features of the power-circuits and the excitation-circuits of a preferred form of embodiment of my invention, utilizing six ignitron-tubes, 1 through 6, which are supplied from a three-phase input-circuit 7 which is energized from a commercial-frequency power-transformer 8, having delta-connected primary windings 9, and zigzag secondary windings 10 having a neutral point 11. The primary windings 9 are energized from a three-phase circuit 13, of 60 cycles or other frequency. The secondary windings 10 energize the three-phase input-circuit 7 of the ignitrons 1 to 6.

The ignitrons are disposed in two groups, 1, 2 and 3, and 4, 5 and 6, respectively. Each phase of the input-circuit 7 is connected to the anode-circuits 14 of two ignitrons, one in each group. The three cathode-circuits 15 of the tubes 1, 2 and 3, in the first group, are connected to a common cathode-bus 16; while the three cathode-circuits 15 of the tubes 4, 5 and 6, of the other group, are connected to another common cathode-bus 17.

As more particularly described and claimed in my copending application, a high-frequency load-circuit is connected to the two cathode-buses 16 and 17, by means of an output-transformer or reactor 20 having a mid-tapped primary winding 21, the midpoint 22 of which is connected to the neutral point 11 of the secondary winding 10 of the power-supply transformer 8, preferably through a direct-current reactor 23, which reduces the circulation of the high-frequency fundamental and harmonic currents in the supply-transformer 8, and also helps to reduce any pulsation in the high-frequency output-voltage wave.

The output-circuit 24 of the converter is shown as being energized from a secondary winding 25 of the output-transformer 20, and it is shown as being connected to an induction furnace 26 which is symbolically represented by an inductance 27 and a resistance 28.

In most cases, it will be necessary to utilize a commutating-capacitor 30, for effecting the high-frequency commutation of the output-currents of the converter, or for at least assisting in the commutation of such currents. As shown in Fig. 1, the commutating-capacitor 30 is connected across the two cathode-buses 16 and 17, that is, across the primary terminals of the output-transformer 20. A second capacitor 31, for power-factor-correction purposes, is also commonly connected across the terminals of the induction-furnace load 26, that is, across the secondary terminals of the output-transformer 20.

It is possible, of course, to omit either one of the capacitors 30 or 31, and to utilize the remaining capacitor to take over the functions of both, increasing the size of the remaining capacitor, for this purpose. It is usually more economical, however, to utilize the capacitor 31 to adjust the power factor of the load to near unity, and to utilize the capacitor 30 solely for commutating purposes, for alternately charging, first in one direction and then the other, during successive half-cycles of the output-frequency, cutting off the output-current at the end of each output-frequency half-cycle, thus extinguishing, or commutating, the load-currents flowing through the main anode-cathode circuits of the several tubes 1 to 6, according to whichever tube is carrying current at the moment.

In accordance with my present invention, a special excitation-circuit is utilized for the converter-tubes 1 to 6.

Each tube, in addition to its anode-circuit 14 and cathode-circuit 15, is provided with a control or shielded grid 33, in closely spaced relation with respect to the anode, an excitation grid 34 in closely spaced relation to the control grid, an ignitor 35, and an auxiliary anode or electrode 36. A tiny circle or dot 37 has been placed within the diagrammatic representation of each tube, as a convention for indicating the presence of a gas or vapor, or other means for causing the ignitor or other control-electrode of the tube to become ineffective, in general, to stop the firing of the tube, once the firing has been initiated. The outer grid 34 acts as a deionizing surface for the inner control grid 33. The spacings between the inner grid and the anode, and between the two grids, should be as small as is mechanically possible, usually about one-quarter of an inch. The grids should be thin, with small holes therein, usually about one-eighth to one-quarter of an inch in diameter. By these expedients, the grids are made more effective to control the tubes at a high-frequency rate.

The exciting currents for the several ignitors 35, of the tubes 1 to 6, are supplied by a set of three single-phase firing-circuit excitation-transformers 40, and six ignitor-coupling insulating-transformers 41.

In accordance with my present invention, the number of ignitor-misfires may be reduced, by connecting the ignitor-coupling transformers 41 in series in pairs, so as to fire the two ignitors which should fire at the same time. The series connection has the advantage that, when one of the two ignitors does not fire as soon as the other, a double voltage is impressed upon the hard-firing ignitor. The series ignitor-firing effect can be obtained in a number of different ways, as by means of a mid-tapped balancing coil 42 which is connected between each secondary winding of the excitation-transformer 40 and the two coupling-transformers 41 which energize the two ignitors 35 which are to be excited by that winding of the excitation-transformer.

The primary windings of the excitation-transformers 40 are energized from an auxiliary three-phase bus 43, which is energized from the secondary windings of an auxiliary transformer 44, the primary windings of which are connected to the main power-circuit 13.

The firing-points, in the input-frequency cycles, are advanced or retarded by means of variably saturable reactors 45, which are connected in series with each of the three secondary windings of the excitation-transformers 40, the saturation of these reactors being controllable by means of a direct-current saturating-coil 46, which is excited from a battery 47 through a controllable rheostat 48.

During each firing half-cycle, the voltage delivered by the secondary winding of the excitation-transformer 40 is built up upon an energy-storing capacitor 49, which is connected in shunt across the firing-excitation circuit. To obtain a valve-action, a fixed saturating reactor 50 is serially connected between the capacitor 49 and the two ignitor-coupling transformers 41 which are served from that circuit. At a predetermined point in the half-cycle, this saturating reactor 50 becomes saturated, thus suddenly losing its impedance, and permitting a heavy current-impulse to be discharged from the capacitor 49 into the ignitor-coupling transformers 41.

The secondary winding of each ignitor-coupling transformer 41 delivers only the positive peaks of its current to the ignitor 35 of the associated one of the main tubes 1 to 6, this action being accomplished by means of a serially connected rectifier 51. A return-path for the flux-decay current of the coupling-transformer 41 is provided in a known manner by means of a rectifier 52 which is connected across the transformer-secondary.

Since my converter is converting from a relatively low frequency to a relatively high frequency, each low-frequency conducting-period, of each tube, must be broken up into a plurality of conducting and non-conducting periods, at the high-frequency rate.

It is a feature of my present invention, that the grids 33 and 34, of each of the converter-tubes 1 to 6, are utilized to alternately block and release the firing of the several tubes, at the output-frequency rate. The two grids 33 and 34 of each tube are energized together, from the same high-frequency source, through separate, serially connected resistors 53 and 54, so that the two grids can assume different potentials according to the amount of grid-current which they respectively draw. Any suitable high-frequency source may be utilized, for energizing the grids 33 and 34 at the desired output-frequency. By way of illustration, an oscillation-generator 55 is shown, which is, or may be, of a conventional and well-understood type, so that no detailed description thereof is needed. The oscillation-generator 55 has two output-windings 56 and 57, which are utilized to provide two output-frequency circuits of opposite potentials, one being positive while the other is negative.

The grid-control circuits also include negative biasing-batteries 58 and 59 respectively, one biasing-battery 58 being for one group of converter-tubes, 1, 2 and 3, while the other biasing-battery 59 is for the other group, 4, 5 and 6. Since each of the two groups of converter-tubes has its own cathode-circuit 16 or 17, which is common to all of the tubes of that group, the grids 33 and 34 of all of the tubes of each group can be energized from the same high-frequency source. Thus, the grids of the tubes 1, 2 and 3 are energized from the high-frequency output-winding 56, in series with the negative biasing-battery 58; while the grids of the tubes 4, 5 and 6 are energized from the high-frequency output-winding 57, in series with the negative biasing-battery 59. In an illustrative case, a negative bias of about 100 volts has been found advisable, for the batteries 58 and 59, in combination with a peak oscillator-voltage of about 200 volts, on each of the oscillator output-windings 56 and 57, although it is to be understood that I am not limited to any particular voltages.

Since the ignitor 35 of each of the converter-tubes is energized only once during each input-frequency cycle, and since the period during which an energizing current flows in the ignitor is only a brief portion of the input-frequency cycle, it will be obvious that the length of the portion of the input-frequency cycle during which any converter-tube could be fired, by the control-action of the grids, at the high-frequency rate, would be limited to the same brief portion of the low-frequency cycle as the duration of the flow of effective ignitor-current, if suitable means were not provided. I therefore utilize an auxiliary anode 36, in each tube; but contrary to ordinary practice, I usually or frequently find it desirable to provide for a wide phase-shift adjustment of the firing-angle, as by means of the rheostat 43. To make this possible, in accordance with my present invention, as shown in Fig. 1, I so excite the auxiliary anode 36, as to maintain a strong holding-arc thereon for 120 input-frequency degrees, plus the input-frequency commutating-angle of the tubes, which may be another 10 or 20 degrees, more or less.

Thus, in Fig. 1, the auxiliary electrodes 36 of the six converter-tubes 1 to 6 are energized from a set of single-phase holding-circuit transformers 60. The three primary windings of the holding-circuit transformers are energized from the auxiliary three-phase input-frequency bus 43. Each of the three holding-circuit transformers 60 has a plurality of secondary windings; and these secondary windings are illustrated as being connected in two zig-zag winding-connections 64 and 65, having neutral points 66 and 67, which are connected to the respective cathode-buses 16 and 17. The several phase-terminals of the zig-zag winding 64 are utilized to energize the auxiliary anodes 36 of the converter-tubes 1, 2 and 3, through separate current-limiting resistors 68, while the several phase-terminals of the zig-zag winding 65 are utilized to energize the auxiliary anodes 36 of the converter-tubes 4, 5 and 6, each through its own resistor 68.

In order to obtain an auxiliary-anode energization-period of 120 input-frequency degrees, or more, for each of the converter-tubes 1 to 6, each tube has its auxiliary-anode 36 energized, not only from the usual phase-circuit, or terminal, of the holding-circuit transformer 60, but also, in parallel therewith, from the next lagging phase-circuit, as shown, for example, at 69. The auxiliary-anode energization-circuits include rectifiers 70, which are connected, in each circuit, in series with each of the phase-terminals of the secondary windings 64 and 65, so as to avoid short-circuiting the parallel-connected windings, while at the same time delivering only the positive impulses of current from the respective windings.

In the operation of the converting apparatus which is shown in Fig. 1, it may be noted that, although the main converter-tubes 1 to 6 are of a type in which neither the two grids 33 and 34 together, nor the ignitor 35, nor the auxiliary anode 36, is capable, in general, of interrupting the flow of a main-circuit current in any tube, once the tube has been fired by establishing an arc between the main anode and the cathode, within the tube, nevertheless a load-circuit is provided, which is of such character as to be able to effect a periodic interruption of the tube-current, or of the main arc within the tube, at the output-frequency rate. In the circuit which is shown in Fig. 1, this current-interrupting or commutating function is performed principally by the parallel-connected capacitor 30.

In the control-circuits, it is to be noted that each of the main converter-tubes 1 to 6 is fired once, during each input-frequency cycle, by the energization of its ignitor-circuit. When the ignitor 35 of any tube establishes a firing-arc, the auxiliary anode 36 of that tube practically instantly fires, and picks up a holding-arc, which is maintained for 120 input-frequency degrees, plus the input-frequency commutating-time of the tubes, or for any other desired or necessary length of time. The commutating-time of the tubes is the time necessary to transfer the main arc from one input-phase to another; and this commutating time can be shortened by utilizing a main transformer 8 which has a low reactance, and by other means.

While the grids 33 and 34 can not, in general, interrupt the main arc in their tube, once said main arc has been established, they can prevent the establishment of the main arc, if the grids are sufficiently negative with respect to the cathode of the tube, or if the control-grid 33 has a potential which is more negative than a certain critical potential. It is to be noted that the grids 33 and 34 of each tube are governed by a combination of a negative bias and a single-phase high-frequency voltage, so that, during a portion of each high-frequency cycle, the grids are sufficiently negative to block the firing or initiation of the main arc in the tube, after which the grids become sufficiently positive, at a predetermined point in each high-frequency cycle, to permit the firing of the tube, provided that an exciting-arc is being carried, either by the ignitor 35 or by the auxiliary electrode 36, and provided, also, that the main anode of the tube is sufficiently positive with respect to the tube-cathode, at the moment.

It is to be noted that the grids of the tubes of one group of converter-tubes, namely the tubes 1, 2 and 3, become sufficiently positive, so as to "release" the respective tubes, for firing, during positive half-cycles of the output-frequency, while the grids of the tubes of the other group, 4, 5 and 6, "release" their tubes during the negative half-cycles of the output-frequency. Thus, one or more tubes of one group is carrying current during one half-cycle of the output-frequency, while none of the tubes of the other group are carrying current, the circuit being completed through the direct-current connection 22—23. The zig-zag connection of the main-transformer secondaries 10 prevents this direct current from saturating the transformer.

During the next high-frequency half-cycle, the first group of tubes is non-conducting, while the second tube-group is conducting current.

During this interchange, when power is being supplied alternately by the cathode-bus 16 and by the cathode-bus 17, at the high-frequency rate, the parallel-connected capacitor 30 is alternately charging and discharging, first in one direction and then in the other, cooperating with the direct-current return-circuit path 22—23 to also provide a return-path for whichever tube-group is carrying current at the moment, while also performing the function of interrupting the high-frequency current when the other tube-group is released, during any half-cycle of the high or output-frequency.

In Fig. 2, a different form of power-circuit is shown, by way of illustration, while the control-circuits are essentially the same, with variations which are believed to be obvious, so that no further detailed explanation is considered necessary, in regard to the control-circuits of Fig. 2.

In Fig. 2, I show six main converter-tubes, T1 to T6, which may be ignitrons similar to the tubes 1 to 6 of Fig. 1. These tubes are connected back-to-back, so as to be energized from a three-phase supply-line L1, L2, L3, which is, in turn, energized from the three-phase star-connected secondary windings 71, of a main power-transformer 72, having primary windings 73 which are energized from the 60-cycle, or other relatively low-frequency, power-line 13. Thus, the anode-circuit 14 of the tube T1, and the cathode-circuit 15 of the tube T4, are connected to the input-line L1; the anode-circuit 14 of the tube T2 and the cathode-circuit 15 of the tube T5 are connected to the input-line L2; and the anode-circuit 14 of the tube T3 and the cathode-circuit 15 of the tube T6 are connected to the input-line L3. The anode-circuits 14 of the tubes T4, T5 and T6 are connected to a common anode-bus 74; while the cathode-circuits 15 of the tubes T1, T2 and T3 are connected to a common cathode-bus 75.

The two buses 74 and 75 are joined by a mid-tapped commutating-reactor 76, having a mid-point 77 which is connected, through a high-frequency output-circuit 78, to the neutral point 79 of the power-transformer secondary 71.

The output circuit 78 serially includes a series-connected resonant-capacitor or commutating-capacitor 81, in series with the primary winding 82 of an output-transformer 83, which supplies an induction-furnace load 26, preferably having a power-factor-correcting capacitor 31, as described in connection with Fig. 1.

The fact that the main tubes T1 to T6 are connected, in two groups, in back-to-back relation, makes it possible for the positive-connected tubes T1, T2 and T3, or any one or more of them, to conduct the positive halves of the output-frequency current, while the negative-connected tubes, T4, T5 and T6, or any one or more of them, conduct the negative halves of the output-frequency current. In general, only one group of tubes conducts current at any time, first the positive, then the negative, then the positive, and so forth, the return-circuit, in either case, being back through the output-circuit 78 to the neutral point 79 of the supply-transformer. This return-circuit 78 thus carries a single-phase alternating current, having the high frequency of the output-circuit. Because the output-frequency is considerably higher than the input-frequency, the input-transformer winding 71 would have a rather high reactance to the output-frequency current in the output-circuit 78, and hence the input-transformer windings 71 are shunted by three Y-connected capacitors 86, the neutral point of which is connected, at 87, to the neutral point 79 of the power-input transformer. The Y-connected capacitors 86 provide a low-impedance path for the high-frequency output-currents.

The serially-connected output-capacitor 81 cooperates with the inductance of the output-circuit 76—78 to constitute an approximately resonant circuit, which is approximately resonant to the output-frequency, so that said capacitor 81 serves more or less as a commutating-capacitor. This commutating action varies, however, if the load or the power factor of the secondary output-circuit 24 varies, but the mid-tapped commutating reactor 76 improves the stability of the converter by making it possible to release one group of tubes before the current has gone to zero in the other group of tubes.

The control-circuits, in Fig. 2, are the same, in principle, as those which have already been shown and described in connection with Fig. 1, the only essential difference being that, in Fig. 2, three of the tubes, T4, T5 and T6, do not have a common cathode-bus, as in Fig. 1, so that their control-circuits have to be separately connected to the several cathodes of said tubes, by suitably insulated transformers. Thus, for example, the high-frequency oscillator 55 has four separate output-windings, 90, 91, 92 and 93, instead of the two output-windings 56 and 57 of Fig. 1. The oscillator output-winding 90 is connected to the cathode-bus 75 through the negative biasing-battery 58, as previously described; while the oscillator output-windings 91, 92 and 93 are connected, through separate biasing-batteries 94, 95 and 96, to the respective supply-lines L1, L2 and L3, which are connected to the cathode-terminals 15 of the respective tubes T4, T5 and T6. The oscillator output-windings 91, 92 and 93 separately energize the grids of these respective tubes T4, T5 and T6.

In Fig. 2, the auxiliary anodes 36 are energized from three ordinary holding-circuit transformers 60', without the parallel-phase energization which makes possible an unusually wide range of phase-adjustment at 48 in Fig. 1.

While I have described my invention in a preferred form of embodiment, in connection with two different kinds of main power-circuits, and while I have described the invention to the best of my present understanding, I wish it to be understood that I am not limited to the circuits, or examples, or explanation herein given. I desire, therefore, that the appended claims shall be accorded the broadest construction consistent with their language.

I claim as my invention:

1. In combination, means for providing an alternating-current input-circuit; means for providing an alternating-current output-circuit, the output-circuit being at a frequency higher than the input-circuit; and a multi-tube converter therebetween, each tube of the converter having a main anode-cathode circuit, a control-electrode means, a holding-circuit means, and shield-grid means, said control-electrode means and said shield-grid means being, in general, incapable of interrupting the current in the main anode-cathode circuit of the tube, once said tube has been fired; said converter comprising a control-means for each tube, including means for exciting the control-electrode means at the input-frequency, means for exciting the holding-circuit means so as to thereafter maintain a ready-to-fire condition in the tube for a considerable portion of an input-frequency cycle, and means for controlling the shield-grid means so as to alternately block and permit the firing of the tube on alternate half-cycles of the output-frequency; and said output-circuit including commutating-means for interrupting successive half-cycles of the output-frequency current.

2. In combination, means for providing an alternating-current input-circuit; means for providing an alternating-current output-circuit, the output-circuit being at a frequency higher than the input-circuit; and a multi-ignitron converter therebetween, each ignitron of the converter having a main anode-cathode circuit, an ignitor, an auxiliary anode, and grid-means; said converter comprising a control-means for each ignitron, including means for exciting the ignitor at the input-frequency, means for exciting the auxiliary anode so as to thereafter maintain a holding-arc for a considerable portion of an input-frequency cycle, and means for controlling the grid-means so as to alternately block and permit the firing of the ignitron on alternate half-cycles of the output-frequency.

3. The invention as defined in claim 2, characterized by said output-circuit including commutating-means for interrupting successive half-cycles of the output-frequency current.

4. The invention as defined in claim 2, characterized by said input-circuit being polyphase, each input-frequency ignitor-exciting means including a broad-range phase-adjustment means for adjusting the time, in each input-phase, at which the ignitor is excited, and each auxiliary-anode exciting-means including holding-circuit transformer-secondaries of two different input-phases, with a serially connected rectifier associated with each, and parallel-circuit connections for exciting each auxiliary anode from said two transformer-secondaries through their respective rectifiers.

5. In combination, means for providing a polyphase first circuit; means for providing a second circuit; and a multi-tube converter connected for interchanging power between said first and second circuits, each tube of the converter having a main anode-cathode circuit, a control-electrode means, and a holding-circuit means, said control-electrode means being, in general, incapable of interrupting the current in the main anode-cathode circuit of the tube, once said tube has been fired; said converter comprising a control-means for each tube, including a broad-range phase-adjustment means for adjusting the time, in each first-circuit phase, at which the control-electrode means is excited; and each holding-circuit means including holding-circuit transformer-secondaries of two different first-circuit phases, with a serially connected rectifier associated with each, and parallel-circuit connections for exciting each holding-circuit means from said two transformer-secondaries through their respective rectifiers.

6. In combination, means for providing a polyphase first circuit; means for providing a second circuit; and a multi-ignitron converter connected for interchanging power between said first and second circuits, each ignitron of the converter having a main anode-cathode circuit, an ignitor, and an auxiliary anode; said converter comprising a control-means for each ignitron, including a broad-range phase-adjustment means for adjusting the time, in each first-circuit phase, at which the ignitor is effectively excited, and means for exciting the auxiliary anode so as to thereafter maintain a holding-arc for a considerable portion of a cycle of the first-circuit frequency, said auxiliary-anode exciting means including holding-circuit transformer-secondaries of two different first-circuit phases, with a serially connected rectifier associated with each, and parallel-circuit connections for exciting the auxiliary anode from said two transformer-secondaries through their respective rectifiers.

7. In combination, means for providing a polyphase first circuit; means for providing an alternating-current second circuit having a frequency different from the first circuit; and a multi-ignitron converter connected for interchanging power between said first and second circuits, each ignitron of the converter having a main anode-cathode circuit, an ignitor, a shield-grid means, and an auxiliary anode; said converter comprising a control-means for each ignitron, including a holding-circuit associated with the auxiliary anode, a shield-grid voltage-source which is modulated at the frequency of one of said circuits, ignitor-energizing means, for energizing said ignitor at the first-circuit frequency, said ignitor-energizing means being phased suitably for determining the time, in each first-circuit cycle, at which the ignitor is effectively excited, and holding-circuit energizing-means for exciting the holding-circuit of the auxiliary anode so as to thereafter maintain a holding-arc for a considerable portion of a cycle of the first-circuit frequency, said holding-circuit energizing-means including holding-circuit transformer-secondaries of two different first-circuit phases, with a serially connected rectifier associated with each, and parallel-circuit connections for exciting the auxiliary anode from said two transformer-secondaries through their respective rectifiers.

8. In combination, means for providing a polyphase first circuit; means for providing an alternating-current second circuit having a frequency different from the first circuit; and a multi-ignitron converter connected for interchanging power between said first and second circuits, each ignitron of the converter having a main anode-cathode circuit, an ignitor, a shield-grid means, and an auxiliary anode; said converter comprising a control-means for each ignitron, including a holding-circuit associated with the auxiliary anode, a shield-grid voltage-source which is modulated at the frequency of the second circuit, ignitor-energizing means, for energizing said ignitor at the first-circuit frequency, said ignitor-energizing means being phased suitably for determining the time, in each first-circuit cycle, at which the ignitor is effectively excited, and holding-circuit energizing-means, for exciting the holding-circuit of the auxiliary anode so as to thereafter maintain a holding-arc for a considerable portion of a cycle of the first-circuit frequency, said holding-circuit energizing-means including holding-circuit transformer-secondaries of two different first-circuit phases, with a serially connected rectifier associated with each, and parallel-circuit connections for exciting the auxiliary anode from said two transformer-secondaries through their respective rectifiers.

9. In combination, means for providing an alternating-current first circuit; means for providing an alternating-current second circuit having a frequency different from the first circuit; and a multi-ignitron converter connected for interchanging power between said first and second circuits, each ignitron of the converter having a main anode-cathode circuit, an ignitor, a shield-grid means, and an auxiliary anode; said converter comprising a control-means for each ignitron, including a holding-circuit associated with the auxiliary anode, a shield-grid voltage-source which is modulated at the frequency of one of said circuits, and means for energizing the ignitor and the auxiliary-anode holding-circuit at the frequency of the first circuit.

10. The invention as defined in claim 9, in combination with phase-adjustment means for adjusting the time, in each first-circuit cycle, at which the ignitor is effectively excited.

11. In combination, means for providing an alternating-current first circuit; means for providing an alternating-current second circuit having a frequency different from the first circuit; and a multi-ignitron converter connected for interchanging power between said first and second circuits, each ignitron of the converter having a main anode-cathode circuit, an ignitor, a shield-grid means, and an auxiliary anode; said converter comprising a control-means for each ignitron, including a holding-circuit associated with the auxiliary anode, a shield-grid voltage-source which is modulated at the frequency of the second circuit, and means for energizing the ignitor and the auxiliary-anode holding-circuit at the frequency of the first circuit.

12. The invention as defined in claim 11, in combination with phase-adjustment means for adjusting the time, in each first-circuit cycle, at which the ignitor is effectively excited.

13. In combination, means for providing an alternating-current first circuit; means including a transformer having a single primary winding for providing an alternating-current second circuit having a frequency different from the first circuit; and a multi-ignitron converter connected for interchanging power between said first and second circuits, each ignitron of the converter having a main anode-cathode circuit, an ignitor, a shield-grid means, and an auxiliary anode; said converter comprising a control-means for each ignitron, including a holding-circuit associated with the auxiliary anode, a shield-grid voltage-source which is modulated at the frequency of the second circuit, and means for energizing the ignitor and the auxiliary-anode holding-circuit at the frequency of the first circuit.

JOHN L. BOYER.